United States Patent [19]
Prescott

[11] Patent Number: 6,147,981
[45] Date of Patent: Nov. 14, 2000

[54] METHOD AND APPARATUS FOR PREDICTIVE PARAMETER CONTROL WITH LOOP DELAY

[75] Inventor: Tobin A. Prescott, San Diego, Calif.

[73] Assignee: Qualcomm Incorporated, San Diego, Calif.

[21] Appl. No.: 08/908,525

[22] Filed: Aug. 7, 1997

[51] Int. Cl.⁷ .................................................. H04B 7/185
[52] U.S. Cl. .................... 370/318; 370/320; 370/335; 370/342; 370/331; 370/332; 370/333; 370/200; 370/205; 455/134; 455/522; 455/69; 455/126; 455/67
[58] Field of Search .................... 370/318, 320, 370/335, 342, 331, 332, 333; 375/200, 205; 455/13.4, 522, 69, 126, 67

[56] References Cited

U.S. PATENT DOCUMENTS

| | | | |
|---|---|---|---|
| 3,925,782 | 12/1975 | Anderl et al. | 343/178 |
| 4,112,257 | 9/1978 | Frost | 179/2 EB |
| 4,123,718 | 10/1978 | Lampert et al. | 325/474 |
| 4,752,967 | 6/1988 | Bustamante et al. | 455/12 |
| 4,765,753 | 8/1988 | Schmidt | 379/60 |
| 4,777,653 | 10/1988 | Bonnerot | 455/69 |
| 4,811,421 | 3/1989 | Havel et al. | 455/69 |
| 4,868,795 | 9/1989 | McDavid et al. | 367/77 |
| 4,870,689 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,093,840 | 3/1992 | Schilling | 375/1 |
| 5,101,501 | 3/1992 | Gilhousen et al. | 455/33 |
| 5,103,459 | 4/1992 | Gilhousen et al. | 375/1 |
| 5,107,487 | 4/1992 | Vilmur et al. | 370/18 |
| 5,128,965 | 7/1992 | Henriksson | 375/58 |
| 5,204,876 | 4/1993 | Bruckert et al. | 375/1 |
| 5,220,678 | 6/1993 | Feei | 455/69 |
| 5,245,629 | 9/1993 | Hall | 375/1 |
| 5,257,283 | 10/1993 | Gilhousen et al. | 375/1 |
| 5,265,119 | 11/1993 | Gilhousen et al. | 375/1 |
| 5,267,262 | 11/1993 | Wheatley, III | 375/1 |
| 5,305,468 | 4/1994 | Bruckert et al. | 455/69 |
| 5,383,219 | 1/1995 | Wheatley, III et al. | 375/1 |
| 5,390,338 | 2/1995 | Bodin et al. | 455/33.1 |
| 5,450,616 | 9/1995 | Rom | 455/69 |
| 5,465,399 | 11/1995 | Oberholtzer et al. | 455/69 |
| 5,487,180 | 1/1996 | Ohtake | 455/54.1 |
| 5,542,111 | 7/1996 | Ivanov et al. | 455/126 |
| 5,623,486 | 4/1997 | Dohi et al. | 370/342 |
| 5,881,367 | 3/1999 | Calot et al. | 455/69 |

FOREIGN PATENT DOCUMENTS

| 9406218 | 3/1994 | WIPO | H04Q 7/04 |
|---|---|---|---|

OTHER PUBLICATIONS

Tanskanen et al., "Predictive Closed Loop Power Control for Mobile CDMA Systems" 1997 IEEE 47th Vehicular Technology Conference, vol. 2, pp. 934–938, XP000736745.

*Primary Examiner*—Huy D. Vu
*Assistant Examiner*—M. Phan
*Attorney, Agent, or Firm*—Gregory D. Ogrod; Sandip S. Minhas

[57] ABSTRACT

A method and apparatus for controlling a power level of a transmitted signal sent from a second station to a first station in a communication system maintains a desired power level of a signal received at the first station. The first station sends a power control command to the second station directing the second station to either increase or decrease the power level of the transmitted signal. The first station generates the power control command based on the power level of the received signal, the desired power level, and at least one pending power control command. Pending power control commands include those power control commands that are propagating between the first station and the second station.

40 Claims, 11 Drawing Sheets

METHOD AND APPARATUS FOR PREDICTIVE PARAMETER CONTROL WITH LOOP DELAY

BACKGROUND OF THE INVENTION

I. Field of the Invention

The present invention relates generally to spread spectrum communication systems, and more particularly, to a method and apparatus for adjusting signal parameters in such systems in the presence of control loop or path delay in detecting signal status and using a controllable element to effect changes in the detected status. The invention further relates to using transmit power as a parameter that is controlled to minimize interference among simultaneously operating transmitters and to maximize the quality of individual communications.

II. Description of the Related Art

A variety of multiple access communication systems and techniques have been developed for transferring information among a large number of system users. However, spread spectrum modulation techniques, such as code division multiple access (CDMA) spread spectrum techniques, provide significant advantages over other modulation schemes, especially when providing service for a large number of communication system users. The use of CDMA techniques in multiple access communication systems is disclosed in U.S. Pat. No. 4,901,307, which issued Feb. 13, 1990, entitled "Spread Spectrum Multiple Access Communication System Using Satellite Or Terrestrial Repeaters," and U.S. patent application Ser. No. 08/368,570, entitled "Method And Apparatus For Using Full Spectrum Transmitted Power In A Spread Spectrum Communication System For Tracking Individual Recipient Phase Time And Energy," both of which are assigned to the assignee of the present invention, and incorporated herein by reference.

These patents disclose communication systems in which a large number of generally mobile or remote system users or subscriber units ("mobile units") employ at least one transceiver to communicate with other mobile units, or users of other connected systems, such as a public telephone switching network. Communication signals are transferred either through satellite repeaters and gateways, or directly to terrestrial base stations (also sometimes referred to as cell-sites or cells).

In CDMA communications, the frequency spectrum can be reused multiple times, thereby permitting an increase in the number of mobile units. The use of CDMA results in a much higher spectral efficiency than can be achieved using other multiple access techniques. However, in order to maximize overall communication system capacity and maintain acceptable levels of mutual interference and signal quality, the transmitted power of signals within the system must be controlled so as to maintain, at a minimum level, the amount of power required for any given communication link. By controlling the transmitted signal power at or near the minimum level, interference with other mobile units is reduced.

In communication systems employing satellites, the communication signals typically experience fading that is characterized as Rician. Accordingly, the received signal consists of a direct component summed with multiple reflected components having Rayleigh fading statistics. The power ratio between the direct component and the reflected components is typically on the order of 6–10 dB, depending upon the characteristics of the mobile unit antenna and the environment in which the mobile unit operates.

In contrast to satellite communication systems, communication signals in terrestrial communication systems typically experience signal fading that typically consists only of the reflected, or Rayleigh, components, without a direct component. Thus, the terrestrial communication signals experience a more severe fading environment than the satellite communication signals where Rician fading is the dominant fading characteristic.

The Rayleigh fading in the terrestrial communication system is caused by the communication signals being reflected from many different features of the physical environment. As a result, a signal arrives almost simultaneously at a mobile unit receiver from many directions with different transmission delays. At the UHF frequency bands usually employed by mobile radio communications including those of cellular mobile telephone systems, significant phase differences in signals traveling on different paths may occur. The possibility for destructive summation of the signals may result in occasional deep fades.

In order to provide a full-duplex channel to allow both directions of a conversation to be simultaneously active, such as provided by the conventional wired telephone system, one frequency band is used for an outbound or forward link, (i.e. transmission from the gateway or cell-site transmitter to the mobile unit receiver), and a different frequency band is utilized for the inbound or reverse link, (i.e. transmission from the mobile unit transmitter to the gateway or cell-site receiver). This frequency band separation allows a mobile unit transmitter and receiver to be active simultaneously without feedback or interference from the transmitter into the receiver.

However, using different frequency bands has significant implications for power control. Using different frequency bands causes multipath fading to be independent processes for the forward and reverse links. Forward link path loss cannot simply be measured and have it assumed that the same path loss is present on the reverse link.

Furthermore, in a cellular mobile telephone system the mobile phone is capable of communications through multiple cell-sites as disclosed in copending U.S. patent application Ser. No. 07/433,030, filed Nov. 7, 1989 entitled "Method And System For Providing A Soft Handoff In Communications In A CDMA Cellular Telephone System," the disclosure of which is incorporated herein by reference. In communications with multiple cell-sites, the mobile unit and cell-sites include a multiple receiver scheme as disclosed in the just mentioned application and further detailed in copending U.S. patent application Ser. No. 07/432,552, also filed Nov. 7, 1989 and entitled "Diversity Receiver In A CDMA Cellular Telephone System," the disclosure of which is also incorporated herein by reference.

One method of power control is to have either the mobile unit or the gateway first measure the power level of a received signal. This power measurement is used, along with a knowledge of transponder downlink transmit power levels for each satellite being used and knowledge of mobile unit and gateway receiver sensitivity, to estimate path loss for each channel of the mobile unit. Either the base station or the mobile unit transceiver can then determine the appropriate power to be used for signal transmissions to the mobile unit, taking into account the path loss estimate, a transmitted data rate, and a satellite receiver sensitivity. In the case of the mobile unit, a request can be made for more or less power in response to such measurements and determinations. At the same time, the gateway can increase or decrease power in response to such requests, or in response to its own measurements.

The signals transmitted by the mobile unit to the satellite are relayed by the satellite to the gateway and generally on to a communication system control system. The gateway or the control system measures the received signal power from the transmitted signals. The gateway then determines the deviation in the received power level from a minimum which is necessary to maintain the desired level of communications. Preferably, the minimum desired power level is that power level necessary to maintain quality communications while reducing system interference.

The gateway then transmits a power control command signal to the mobile unit so as to adjust or "fine tune" the transmit power of the mobile unit. This command signal is used by the mobile unit to change the transmit power level closer to the minimum level required to maintain the desired communications. As channel conditions change, typically due to motion of the mobile unit, or satellite, the mobile unit responds to the control commands from the gateway to continually adjust the transmit power level so as to maintain a proper power level.

In this configuration, the control commands from the gateway are referred to as power control feedback. The power control feedback from the gateway is generally quite slow due to round trip propagation delays through the satellites. A one way propagation delay employing a typical LEO satellite orbit (879 miles) is on the order of 9–26 ms. Thus, a power control command from the gateway can reach the mobile unit up to 26 ms after it was sent. Likewise, a change in the transmitted power made by the mobile unit in response to the power control command is detected by the gateway up to 26 ms after the change was made. The total round-trip propagation delay in this system is on the order of 18–53 ms. Thus, up to 53 ms of delay may elapse between the time a power control command is sent by the gateway and the time the response (i.e., the change in the power level caused by that power control command) is detected back at the gateway.

Thus, a transmit power control command experiences the round trip propagation delay, as well as typical processing delays, before the results of that command can be detected by the measuring unit. Unfortunately, particularly where the propagation delay is large, an adjustment to the transmit power in response to the power control command made by the mobile unit will not occur and be detected by the gateway before the next time the received power is measured at the gateway. This results in another power control command being sent to adjust the transmit power without the benefit of the previous power control command having been implemented. In fact, depending on the propagation delay and the iteration time of the power control loop, several power control commands may be pending or "propagating" before the first power control command is responded to by the mobile unit and the results detected by the gateway. As a result, the transmit power oscillates about a set point in what is referred to as a "limit cycle." That is, the transmit power over- or undershoots from a desired amount due to delays in arrival and implementation of commands.

One possible solution to this problem is to simply increase the iteration time of the power control loop so that it more closely resembles the propagation and processing delays. However, the impact of rapid fading and sudden signal blockages experienced by the communication signals require short iteration times to prevent sudden signal loss. As a result, the transmit power may suddenly, and unnecessarily, be increased, resulting in wasted power and increased system interference.

What is needed is a method and an apparatus that quickly responds to changes in transmit signal power, or other signal parameters, requirements, and counteracts the impact of propagation and processing delays associated with corresponding control commands. It is desirable that such a method and apparatus require little additional complexity, control structure, or protocol changes in the gateways.

SUMMARY OF THE INVENTION

The present invention is directed toward a method and apparatus useful for adjusting signal parameters, preferably transmit signal power, in a communication system. In particular, the present invention is directed toward an apparatus and method for adjusting transmit power, or other operating conditions, in communications systems, such as those employing satellites, that experience significant signal propagation delays. The present invention counteracts the impact of the propagation delays associated with power control commands sent by a gateway to a mobile unit by keeping track of the power control commands that have been previously sent to the mobile unit and whose effect on the transmit signal power has not yet been detected at the gateway.

In one embodiment of the present invention, a power control loop located at the gateway determines a received power level of a signal transmitted from the mobile unit. The power control loop compares the received power level with a desired power level. If the received power level is less than the desired power level, a power control command is sent instructing the mobile unit to increase its transmit power. If the received power level is greater than the desired power level, a power control command is sent instructing the mobile unit to decrease its transmit power.

Due to propagation delays arising from distance between the gateway and the mobile, especially in satellite-based communication systems, several power control commands, or their associated responses, may be in transit between the gateway and the mobile unit. A first set of power control commands includes power control commands that are propagating along a forward link of the communication system and have not yet reached the mobile unit. The mobile unit has not responded to the first set of power control commands by adjusting its transmit power because the power control commands have not been received.

A second set of power control commands includes power control commands whose effects (i.e., signals with adjusted power levels) are propagating along a reverse link of the communication system and have not yet reached a gateway. The mobile unit has received and responded to these power control commands, but their corresponding adjustments in the transmit power level have not reached the gateway for detection.

One of the features of the present invention is to keep track of both the first set of power control commands (i.e., those propagating along the forward link that have not reached the mobile user) and the second set of power control commands (i.e., those whose adjustments are propagating along the reverse link and whose adjustments have not yet been detected by the gateway) as a set of "pending" power control commands. The pending power control commands are used by the power control loop to determine new power control commands. Specifically, the pending power control commands are added to the received power level prior to comparing it with the desired power level. In this way, the pending power control commands are accounted for in subsequent determinations of new power control commands. This reduces the oscillations, referred to as "limit cycles," of the transmit power about the desired power level.

Another feature of the present invention is that it does not require additional complexity, additional control structure, or changes in the power control command protocol of conventional communication systems. Furthermore, this technique provides similar improvements for systems that employ a multi-bit power control command protocol. Thus, changes to the power control command protocol are not required. Furthermore, the present invention can be incorporated into conventional power control loops with only minor alterations.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is particularly suited for use in communications systems employing Low Earth Orbit (LEO) satellites. However, as would be apparent to one skilled in the relevant art, the concept of the present invention can also be applied to satellite systems that are not utilized for communications purposes. The invention is also applicable to satellite systems in which the satellites travel in non-LEO orbits, or to non-satellite repeater systems, if there is sufficiently large propagation delay of the signals.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination, and satellite and terrestrial cellular telephone systems. A preferred application is in CDMA wireless spread spectrum communication systems for mobile or portable telephone service.

Figure 1:
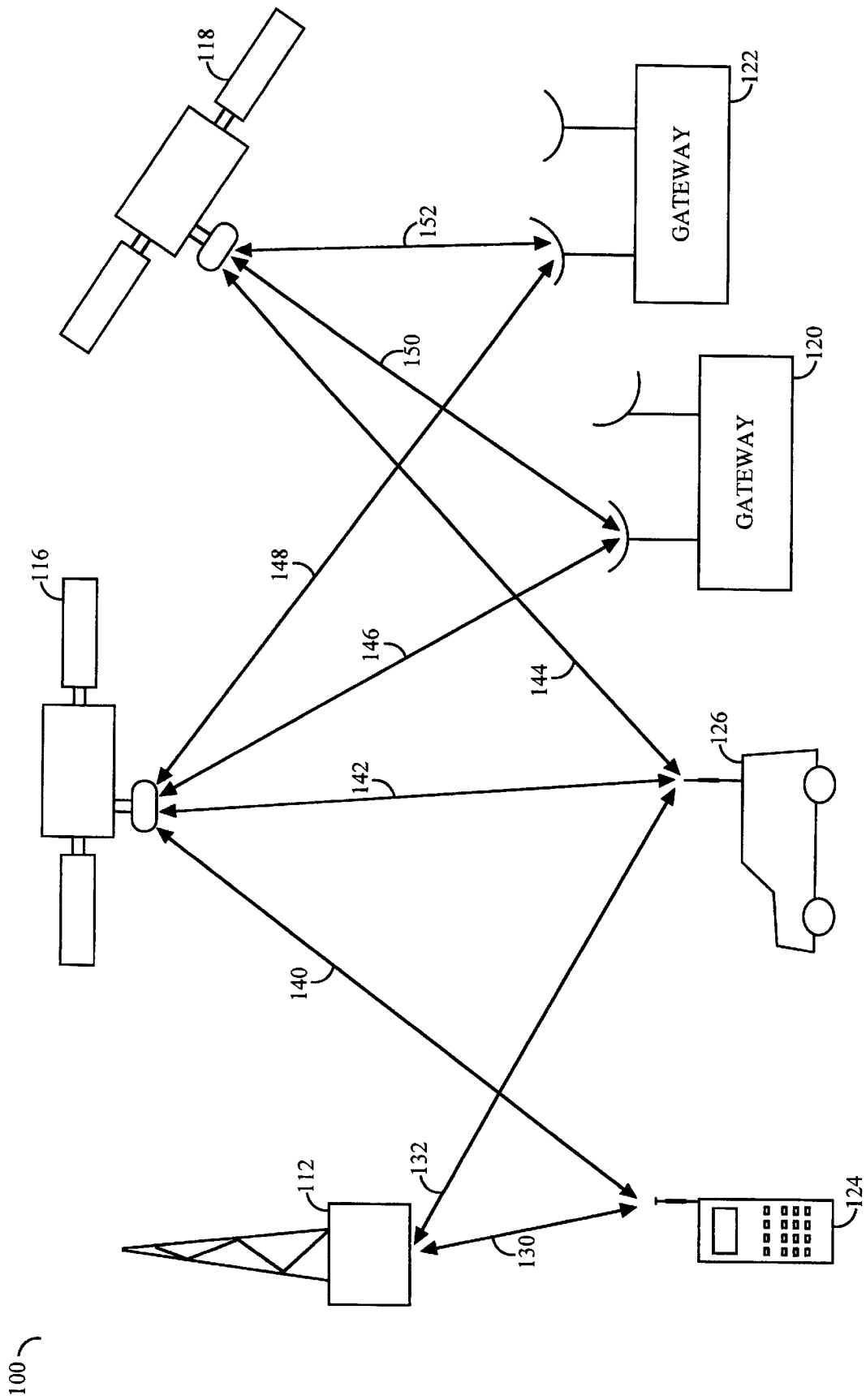
FIG. 1 illustrates a typical wireless communication system in which the present invention is used.

An exemplary wireless communication system in which the present invention is useful, is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote mobile units 124 and 126. Typically, the base stations and satellites/gateways are components of separate communication systems, referred to as being terrestrial and satellite based, although this is not necessary. The total number of base stations, gateways, and satellites in such systems depend on desired system capacity and other factors well understood in the art.

Mobile units 124 and 126 each include a wireless communication device such as, but not limited to, a cellular telephone, a data transceiver or transfer device (e.g., computers, personal data assistants, facsimile), or a paging or position determination receiver, and can be hand-held or vehicle-mounted as desired. Typically, such units are hand-held or vehicle mounted as desired. Here, the mobile units are illustrated as hand-held telephones. However, it is also understood that the teachings of the invention are applicable to fixed units or other types of terminals where remote wireless service is desired, including 'indoor' as well as 'open air' locations.

The terms base station, gateway, hub, and fixed station are sometimes used interchangeably in the art, with gateways generally understood as comprising specialized base stations that direct communications through satellites. Mobile units are also referred to as subscriber units, user terminals, mobile stations, or simply "users," "mobiles," or "subscribers" in some communication systems, depending on preference.

Generally, beams from satellites 116 and 118 cover different geographical areas in predefined patterns. Beams at different frequencies, also referred to as CDMA channels or 'sub-beams,' can be directed to overlap the same region. It is also readily understood by those skilled in the art that beam coverage or service areas for multiple satellites, or cellular base stations, might be designed to overlap completely or partially in a given region depending on the communication system design and the type of service being offered, and whether space diversity is being achieved. For example, each may provide service to different sets of users with different features at different frequencies, or a given mobile unit may use multiple frequencies and/or multiple service providers, each with overlapping geophysical coverage.

A variety of multi-satellite communication systems have been proposed with an exemplary system employing on the order of 48 or more satellites, traveling in eight different orbital planes in LEO orbits for servicing a large number of mobile units. However, those skilled in the art will readily understand how the teachings of the present invention are applicable to a variety of satellite system and gateway configurations, including other orbital distances and constellations. At the same time, the invention is equally applicable to terrestrial-based systems of various base station configurations.

In FIG. 1, some possible signal paths are illustrated for communications being established between mobile units 124 and 126 and base station 112, or through satellites 116 and 118, with gateways 120 and 122. The base station-mobile unit communication links are illustrated by lines 130 and 132. The satellite-mobile unit communication links between satellites 116 and 118, and mobile units 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communication systems or simply to transfer messages or date to mobile units 124 and 126.

Figure 2:
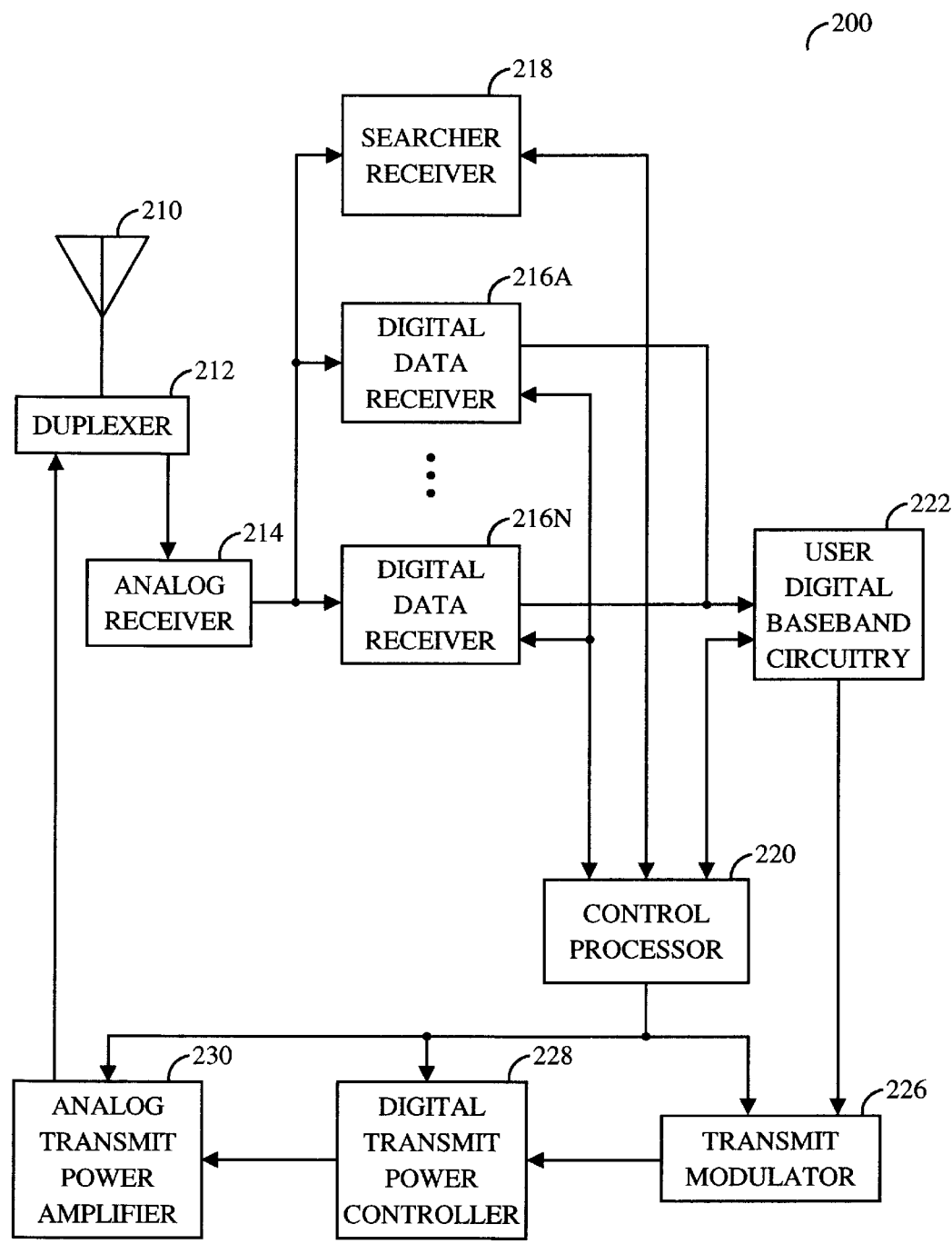
FIG. 2 illustrates an exemplary transceiver apparatus for use by a mobile user.

An exemplary transceiver 200 for use in the mobile units 124 or 126 (as shown in FIG. 1) is illustrated in FIG. 2. Transceiver 200 uses at least one antenna 210 for receiving communication signals which are transferred to an analog receiver 214, where they are downconverted, amplified, and digitized. A duplexer element 212 is typically used to allow the same antenna to serve both transmit and receive functions. However, some systems employ separate antennas for operating at different transmit and receive frequencies.

The digital communication signals output by analog receiver 214 are transferred to at least one digital data receiver 216A and at least one digital searcher receiver 218. Additional digital data receivers 216B–216N can be used to obtain desired levels of signal diversity, depending on the acceptable level of unit complexity, as would be apparent to one skilled in the relevant art.

At least one mobile unit control processor 220 is coupled to digital data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of PN code sequences or orthogonal functions to be used for processing communication signal waveforms. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 216A–216N are coupled to digital baseband circuitry 222 within the mobile unit. User digital baseband circuitry 222 comprises processing and presentation elements used to transfer information to and from a mobile unit user. That is, signal or data storage elements, such as transient or long term digital memory; input and output devices such as display screens, speakers, keypad terminals, and handsets; A/D elements, vocoders and other voice and analog signal processing elements; etc., all form parts of the user digital baseband circuitry 222 using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originating with the mobile unit, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Mobile unit 200 can also employ one or more precorrection elements (not shown), as desired, in the transmission path to adjust the frequency of outgoing signals. This can be accomplished using one or a variety of well known techniques. Mobile unit 200 can also employ a precorrection element in the transmission path to adjust the timing of outgoing signals, using well known techniques of adding or subtracting delay in the transmission waveform.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 222. Alternatively, the information can be inserted as predetermined control bits by transmit modulator 226 or transmit power controller 228 under control of control processor 220. See for example U.S. Pat. No. 5,383,219, entitled *"Fast Forward Link Power Control In A Code Division Multiple Access System,"* issued Jan. 17, 1995; U.S. Pat. No. 5,396,516, entitled *"Method And System For The Dynamic Modification Of Control Parameters In A Transmitter Power Control System,"* issued Mar. 7, 1995; and U.S. Pat. No. 5,267,262, entitled *"Transmitter Power Control System,"* issued Nov. 30, 1993.

Digital receivers 216A–N and searcher receiver 218 are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. Therefore, the outputs of these units can be monitored to determine the energy in, or frequency of, the pilot signal or other signals. These receivers also employ frequency tracking elements that can be monitored to provide current frequency and timing information to control processor 220 for signals being demodulated.

Figure 3:
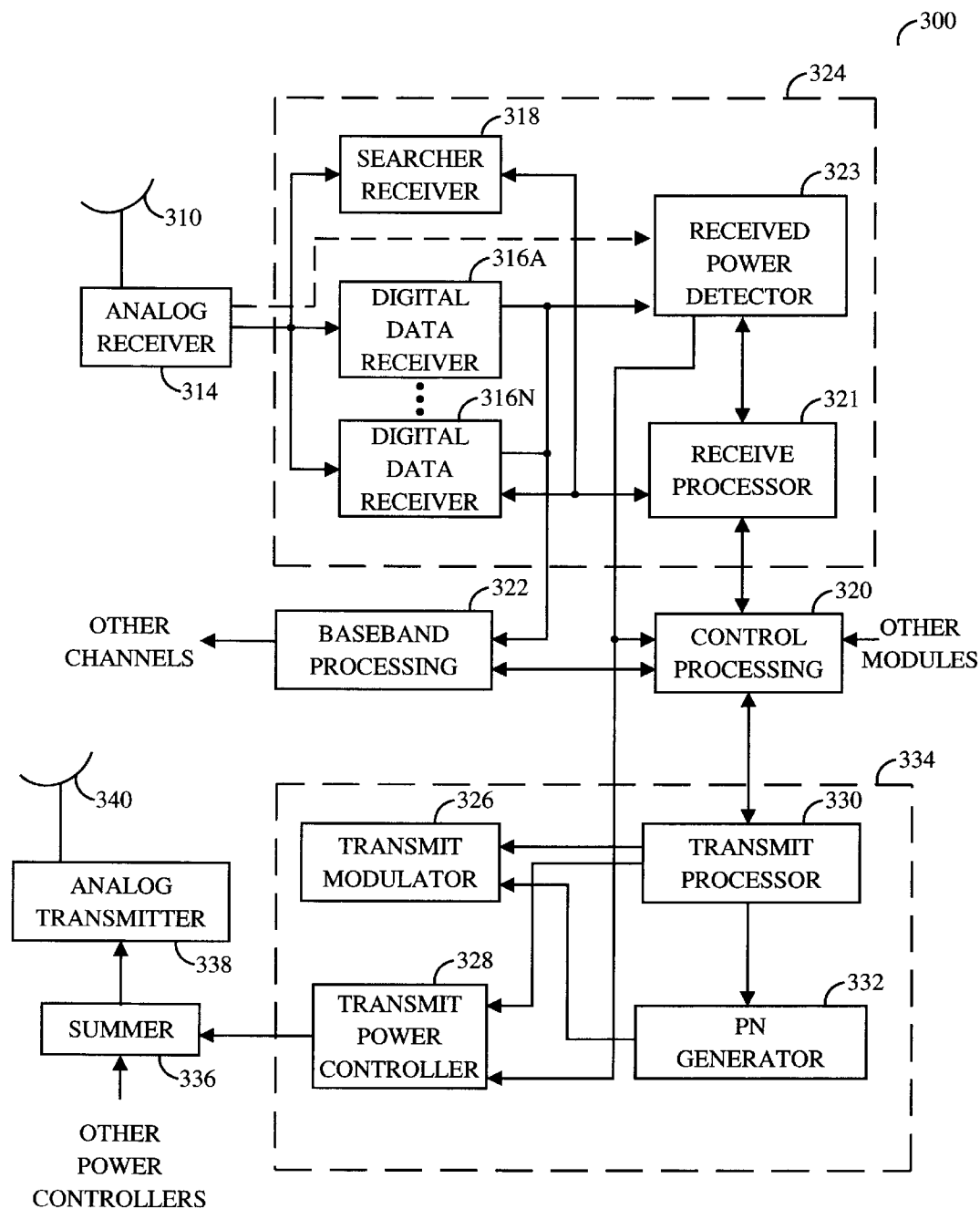
FIG. 3 illustrates an exemplary transmission and reception apparatus for use in a gateway.

An exemplary transmission and reception apparatus 300 for use in gateways 120 and 122 is illustrated in FIG. 3. The portion of gateway 120, 122 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120, 122 and one mobile unit 124, 126, although certain variations are known in the art. One analog receiver 314 can provide inputs for many digital receiver modules 324, and a number of such modules are typically used in gateways 120, 122 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each subscriber. Exemplary baseband apparatus also includes interface circuits for providing output data, typically to a digital switch or network.

On the input side, a variety of other known elements such as, but not limited to, vocoders, data modems, and digital data switching and storage components may form a part of baseband processing elements 322. These elements operate to process, control, or direct the transfer of voice and data signals to one or more transmit modules 334.

Signals to be transmitted to mobile units are each coupled to one or more appropriate transmit modules 334. A typical gateway uses a number of such transmit modules 334 to provide service to many mobile units 124, 126 at a time, and for several satellites and beams at a time. The number of transmit modules 334 used by gateway 120, 122 is determined by factors well known in the art, including system complexity, number of satellites in view, subscriber capacity, degree of diversity chosen, and the like.

Each transmit module 334 includes a transmit modulator 326 which spread spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateway 120, 122.

The output of transmit power controller 328 is transferred to a summer 336 where it is summed with the outputs from other transmit power control circuits. Those outputs are signals for transmission to other mobile units 124,126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to mobile units 124, 126. Antennas 310 and 340 may be the same antennas depending on the complexity and configuration of the system.

As in the case of mobile unit 200, one or more precorrection elements or precorrectors can be disposed in the transmission path to adjust the output frequency based on known Doppler for the link through which communication is established. Techniques or elements used to adjust the frequency of signals prior to transmission are well known in the art. In addition, the same or another precorrector can operate to adjust the output timing based on known propagation delay and code Doppler for the link through which communication is established. Techniques or elements used to adjust the timing of signals prior to transmission are also well known in the art.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in subscriber communications.

Control processor 320 also controls the generation and power of pilot, synchronization, and paging channel signals and their coupling to transmit power controller 328. The pilot channel is simply a signal that is not modulated by data, and may use a repetitive unchanging pattern or non-varying frame structure type input to transmit modulator 326, effectively transmitting only the PN spreading codes applied from PN generator 332.

While control processor 320 can be coupled directly to the elements of a module, such as transmit module 334 or receive module 324, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner a single control processor 320 can control the operations of a large number of modules and resources more efficiently. Transmit processor 330 controls generation of, and signal power for, pilot, synchronization, paging signals, and traffic channel signals, and their respective coupling to power controller 328. Receiver processor 321 controls searching, PN spreading codes for demodulation and monitoring received power.

As discussed above for the user terminal, a received power detector 323 can be used to detect the power in the signal as determined by the analog receiver 314, or by monitoring the energy in the outputs of digital receivers 316. This information is provided to transmit power controller 328 to adjust the output power as part of a power control loop as is discussed in further detail below. This information can also be provided to receiver processor 321 or control processor 320 as desired. This information can also incorporated as a function in receive processor 321.

For certain operations, such as shared resource power control, gateways 120 and 122 receive information such as received signal strength, frequency measurements, or other received signal parameters from mobile units in communication signals. This information can be derived from the demodulated outputs of data receivers 316 by receive processors 321. Alternatively, this information can be detected as occurring at predefined locations in the signals being monitored by control processor 320, or receive processors 321, and transferred to control processor 320. Control processor 320 may use this information to control the timing and frequency, as well as output power, of signals being transmitted and processed using transmit power controllers 328 and analog transmitter 338.

During communication system 100 operation, a communication signal s(t), referred to as a forward link signal, is transmitted by a gateway (120, 122) to a mobile unit (124, 126) using a gateway generated carrier frequency of $A_0$. The forward link signal experiences time delays, a propagation delay, frequency shifts due to Doppler, and other effects. The forward link signal experiences these effects first, while transmitting from a gateway to the satellites (i.e., on an uplink portion of the forward link signal), and second, when transmitting from satellites to mobile units (i.e., on a downlink portion of the forward link signal). Once the signal is received, there is a further delay in sending a return or reverse link signal, a propagation delay, and Doppler in the transmit from the mobile unit to the satellite (i.e., on an uplink portion of the reverse link signal) and again from the satellite to the gateway (i.e., on a downlink portion of the reverse link signal).

Figure 4:
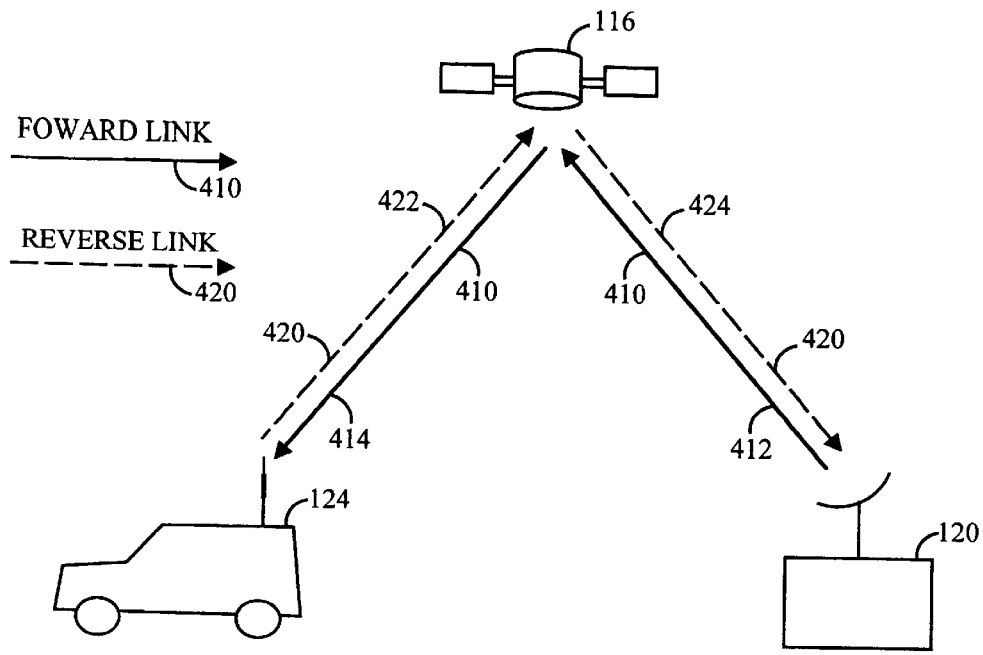
FIG. 4 illustrates a forward link and a reverse link transmission between a gateway and a mobile user.

FIG. 4 illustrates the various signals transmitted in communication system 100 employing one or more satellite repeaters 116. Gateway 120 transmits a forward link signal 410 to mobile unit 124 via satellite repeater 116. Forward link signal 410 is comprised of an uplink portion 412 from gateway 120 to satellite repeater 116 and a downlink portion 414 from satellite repeater 116 to mobile unit 124. Mobile unit 124 transmits a reverse link signal 420 to gateway 120 via satellite repeater 116. Reverse link signal 420 is comprised of an uplink portion 422 from mobile unit 124 to satellite repeater 116 and a downlink portion 424 from satellite repeater 116 to gateway 120.

Figure 5:
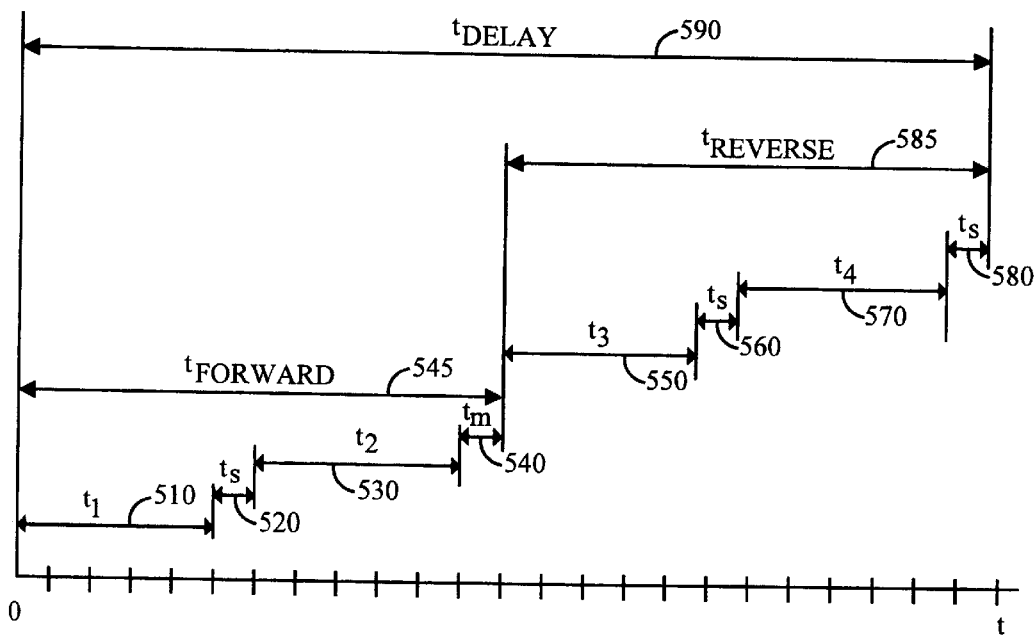
FIG. 5 illustrates timing of a power control command along a forward link and a reverse link of a communication system.

FIG. 5 is an illustration of timing of a power control command transferred over forward link 410 and of the response (i.e., corresponding change in transmit power level) of the power control command over reverse link 420. Timing of the power control command sent by gateway 120 to mobile unit 124 will now be discussed with respect to FIG. 4 and FIG. 5. When gateway 120 transmits the power control command over forward link signal 410 to satellite repeater 116, the power control command experiences a propagation delay 510 ($t_1$) on uplink portion 412 as a result of a distance between gateway 120 and satellite repeater 116. At satellite repeater 116, the power control command experiences a processing delay 520 ($t_s$) as satellite repeater 116 processes uplink portion 412 in order to transmit downlink portion 414 to mobile unit 124. That is, the power control command experiences processing delay 520 when, for example, the satellite performs frequency conversion or beam forming. Next, the power control command experiences a propagation delay 530 ($t_2$) on downlink portion 414 as a result of a distance between satellite repeater 116 and mobile unit 124.

At mobile unit 124, the power control command is processed by control processor 220 and digital transmit power controller 228. As a result of this processing, mobile unit 124 adjusts a transmit power of reverse link signal 420. During this processing, the power control command experiences a processing delay 540 ($t_m$).

In summation, the power control command experiences a forward link delay 545 ($t_{forward}$), before mobile unit 124 adjusts the transmit power level, that can be expressed as:

$$t_{forward}=t_1+t_s+t_2+t_m.$$

Forward link delay 545 represents the amount of delay between a time when the power control command is sent by gateway 120 and when an adjustment to the transmit power of reverse link signal 420 occurs.

Timing of a response to the power control command performed by mobile unit 124 on reverse link signal 420 will also be discussed with respect to FIG. 4 and FIG. 5. After mobile unit 124 adjusts the transmit power of reverse link signal 420, mobile unit 124 transmits uplink portion 422 to satellite repeater 116. The response to the power control command (i.e., change in the transmit power level for reverse link signal) experiences a propagation delay 550 ($t_3$) on uplink portion 422 as a result of a (current) distance between mobile unit 124 and satellite repeater 116. At satellite repeater 116, the response to the power control command experiences a processing delay 560 ($t_s$) as satellite repeater 116 processes uplink portion 422 in order to transmit downlink portion 424 to gateway 120. Next, the response to the power control command experiences a propagation delay 570 ($t_4$) on downlink portion 424 as a result of a distance between satellite repeater 116 and gateway 120.

At gateway 120, the response to the power control command is processed by receivers 214, 216, and 218 and by control processor 320. As a result of this processing, gateway 120 detects a received power level of reverse link signal 420 and determines a new power control command based on the received power level and a desired power level as discussed above. During this processing, the response to the power control command (i.e., detected power level in reverse link signal) experiences a small processing delay 580 ($t_g$).

In summation, the response to the power control command experiences a reverse link delay 585 ($t_{reverse}$) expressed as:

$$t_{reverse}=t_3+t_s+t_4+t_g.$$

Reverse link delay 585 represents the amount of delay between a time when the response to the power control command is sent by mobile unit 124 and when the response is detected by gateway 120.

A total delay 590 ($t_{delay}$) experienced between a time when the power control command is sent by gateway 120 and when the response to the power control command is detected by gateway 120 is defined as:

$$t_{delay}=t_{forward}+t_{reverse}=t_1+t_2+t_3+t_4+t_m+t_g+2{}^*t_s.$$

As a practical matter, $t_1$, $t_2$, $t_3$, and $t_4$ comprise the majority of delay 590. In a typical LEO satellite application using the present invention, each of the propagation delays 545, 585 is on the order of 9–26 ms. Total delay 590 is on the order of 18–53 ms. Total delay 590 is also referred to as round-trip propagation delay 590.

In satellite communication systems, gateways 120 generally have a fairly accurate estimation of delays imposed on signals traversing between gateways 120 and satellites 116 (i.e., $t_1$ and $t_4$) at any given time because of the well defined orbital patterns used by satellites 116, and known locations of gateways 120 relative to those orbits.

Figure 6:
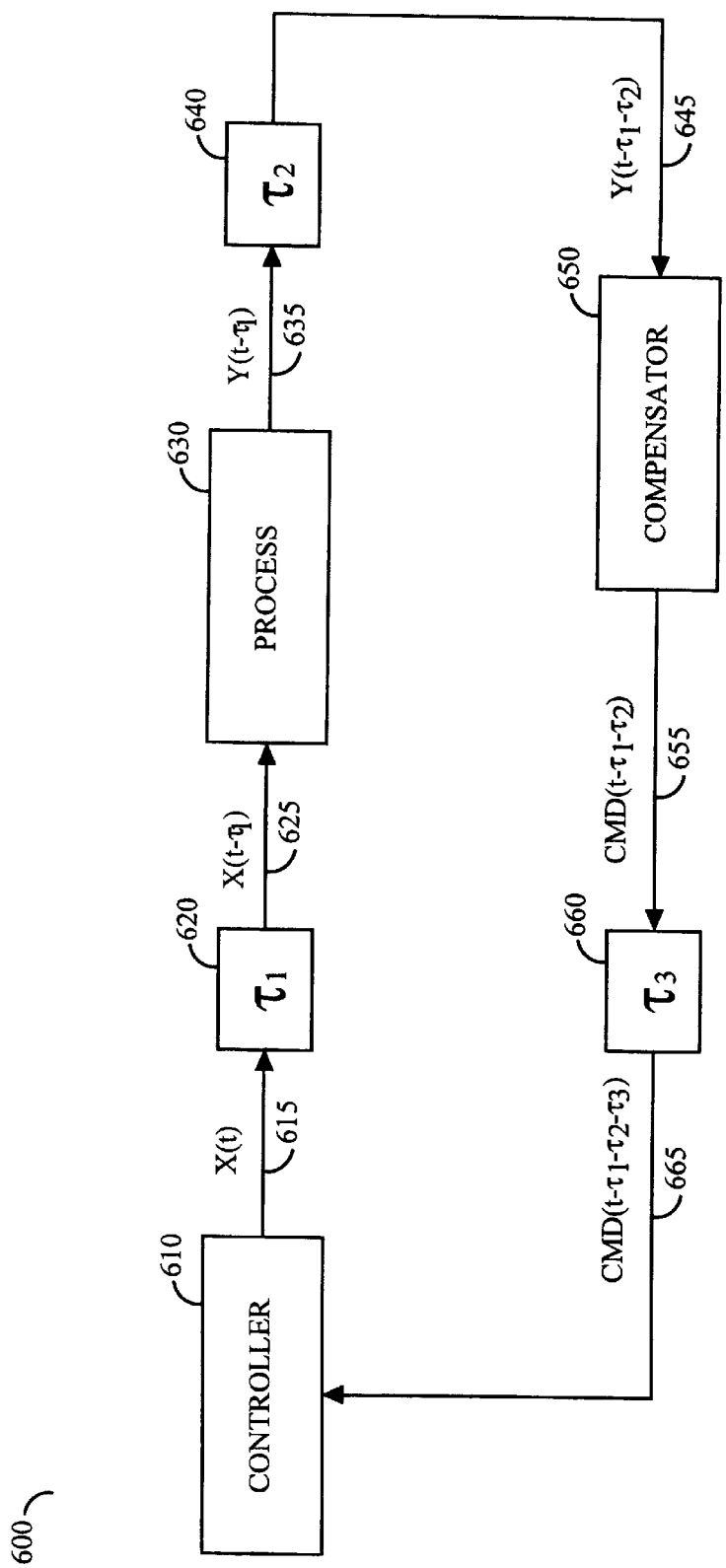
FIG. 6 illustrates a power control loop.

FIG. 6 shows a power control loop 600. Power control loop 600 includes a controller 610, a first delay block 620, a process 630, a second delay block 640, a compensator 650, and a third delay block 660. In one embodiment of the present invention, controller 610, located in mobile unit 124, represents the power control loop functions in transceiver 200, particularly those of control processor 220 and digital transmit power controller 228, as shown in FIG. 2. Further, with respect to this embodiment of the present invention, compensator 650, located in gateway 120, represents the power control loop functions in control processor 320, as shown in FIG. 3.

The operation of power control loop 600 will now be discussed primarily with reference to FIG. 6, and secondarily with respect to FIG. 4 and FIG. 5. Controller 610 outputs a signal 615 (shown as x(t) in FIG. 6) at a particular transmit power level. In a preferred embodiment of the present invention, signal 615 represents uplink portion 422 of reverse link signal 420 from mobile unit 124 to gateway 120. Signal 615 experiences a delay through delay block 620 of $\tau_1$. In this embodiment, $\tau_1$ corresponds to an estimate of propagation delay 550 (shown as $t_3$ in FIG. 5), as discussed above. As a result of delay block 620, signal 615 is transformed into a signal 625 (shown as x(t−$\tau_1$) in FIG. 6). Signal 625 corresponds to signal 615 delayed in time by $\tau_l$.

In a typical LEO satellite application using the present invention, propagation delays 510, 530, 550, and 570 dominate processing delays 520, 540, 560, and 580 and, thus, processing delays 520, 540, 560, and 580 are ignored. Alternatively, accurate estimates of such processing delays could be used, when known. Thus, as discussed above, $\tau_1$ is approximated as $t_3$. Further, as discussed below, $\tau_2$ is approximated as $t_4$, and $\tau_3$ is approximated as $t_1+t_2$. As would be apparent, if processing delays 520, 540, 560, and 580 are significant in comparison to propagation delays 510, 530, 550, and 570, they may be accounted for in $\tau_1$, $\tau_2$, and $\tau_3$ as well. For purposes of this discussion, "propagation delay" includes any processing delays as well.

Signal 625 is received by process 630. Process 630 represents attenuation and other effects such as fading, as signal 625 is propagated from mobile unit 124 to gateway 120. In other words, process 630 represents a transfer function of the atmosphere/environment through which signal 625 passes as it propagates from mobile unit 124 to gateway 120 via satellite 116. A signal 635 (shown as $y(t-\tau_1)$ in FIG. 6) results from process 630. Signal 635 represents attenuated and faded signal 625 as would be apparent.

Next, signal 635 is delayed by delay block 640. Signal 635 experiences a delay through delay block 640 of $\tau_2$. In this embodiment, $\tau_2$ corresponds to an estimate of propagation delay 570 (shown as $t_4$ in FIG. 5) as discussed above. As a result of delay block 640, signal 635 is transformed into a signal 645 (shown as $y(t-\tau_1-\tau_2)$ in FIG. 6). Signal 645 corresponds to signal 635 delayed in time by $\tau_2$. The delay $\tau_2$ represents the propagation delay of downlink portion 424 of reverse link signal 420 as discussed above.

Signal 645 represents the signal received by gateway 120 as transmitted from mobile unit 124. In particular, signal 645 represents the signal transmitted by mobile unit 124 after it has been delayed by $\tau_1$ and $\tau_2$, and attenuated and faded according to process 630.

Compensator 650 receives signal 645 and determines a power level of signal 645 according to well-known methods. As discussed above, it is desirable that the power level of signal 645 match a minimum desired power level. For example, if the power level of signal 645 is less than the desired power level, then compensator 650 issues a power control command that instructs controller 610 to increase the transmit power of signal 615. On the other hand, if the power level of signal 645 is greater than the desired power level, then compensator 650 issues a power control command that instructs controller 610 to reduce the transmit power level of signal 615.

In a preferred embodiment of the present invention, compensator 650 issues a single-bit power control command. In other words, compensator 650 either issues a power-up command or a power-down command. A general discussion of such a power control system is disclosed in U.S. Pat. No. 5,396,516, which issued Mar. 7, 1995, entitled *"Method And Apparatus For The Dynamic Modification Of Control Parameters In A Transmitter Power Control System,"* which is assigned to the assignee of the present invention, and incorporated herein by reference. In a preferred embodiment of the present invention, a power-up command instructs controller 610 to increase the transmit power of signal 615 by a fixed amount, e.g., 1 dB. A power-down command instructs controller 610 to decrease the transmit power of signal 615 by a fixed amount, e.g., 1 dB. As would be apparent, different fixed amounts could be used. As would also be apparent, more bits of power control commands could be implemented which would provide varying levels of power control adjustments.

Furthermore, in a preferred embodiment of the present invention, compensator 650 issues a power-up command when the power level of signal 645 is less than a desired power level. At all other times, compensator 650 issues a power-down command. As would be apparent, additional levels could be implemented that would provide for a zero power command when the received power level of signal 645 is within a specific range of desired power levels.

In another embodiment of the present invention, a power-up command would increase the power level of signal 615 by a first fixed amount and a power-down command would decrease the power level of signal 615 by a second fixed amount, where the first fixed amount is less than the second fixed amount. In this embodiment, power control loop 600 would reduce the power level of signal 615 much quicker than it would increase the power level of signal 615. This embodiment responds quicker to reduce the power levels of signals in the CDMA communication system, which, as discussed above, reduces an amount of interference any one particular signal experiences.

Compensator 650 outputs a command 655 (shown as $CMD_r(t-\tau_1-\tau_2)$ in FIG. 6). As described above with respect to the preferred embodiment of the present invention, power control command 655 is either a power-up command or a power-down command. Power control command 655 is output by compensator 650 in response to signal 615 which has been delayed due to propagation on reverse link 420 by an amount equal to $\tau_1+\tau_2$ (i.e., the one way propagation delay).

Power control command 655 is transmitted from gateway 120 to mobile unit 124 via forward link 410. As power control command 655 propagates over forward link 410, power control command 655 experiences another propagation delay represented by delay block 660. Delay block 660 delays power control command 655 by an amount $\tau_3$ which corresponds to the propagation delays on both uplink portion 412 and downlink portion 414 of forward link 410. In this embodiment of the present invention, $\tau_3$ corresponds to the sum of delay 510 and delay 520 (shown in FIG. 5 as $t_1$ and $t_2$).

The output of delay block 660 is a signal 665 (shown as $CMD_r(t-\tau_1-\tau_2-\tau_3)$ in FIG. 6). Signal 665 represents power control command 655 delayed by the propagation delay between gateway 120 and mobile unit 124. Signal 665 is received by controller 610. Signal 665 represents a power control command to controller 610. In a preferred embodiment of the present invention, signal 665 instructs controller 610 to either increase the transmit power of signal 615 by a fixed amount or to decrease the transmit power of signal 615 by a fixed amount. However, as described above, a total delay of $\tau_1+\tau_2+\tau_3$ seconds has been experienced by signal 615 in power control loop 600. In other words, $\tau_1+\tau_2+\tau_3$ seconds have passed between a time when a signal 615 was transmitted from mobile unit 124 and when a power control command sent by compensator 650 to change a power level of that signal 615 is received by mobile unit 124. When $\tau_1+\tau_2+\tau_3$ is significantly large (e.g., exceeds the loop iteration time of controller 610), the delay poses a significant problem in controlling the power level of signal 615.

In particular, compensator 650 will not detect a change in the power level of signal 615 in response to a command until an amount of time equal to $\tau_1+\tau_2+\tau_3$ has passed. If the iteration time of compensator 650 is small in comparison to $\tau_1+\tau_2+\tau_3$, compensator 650 will have issued multiple power control commands 655 before any of the responses to those power control commands 655 are detected as signal 645. This introduces a phenomenon in power control loop 600 referred to as a limit cycle.

Figure 7:
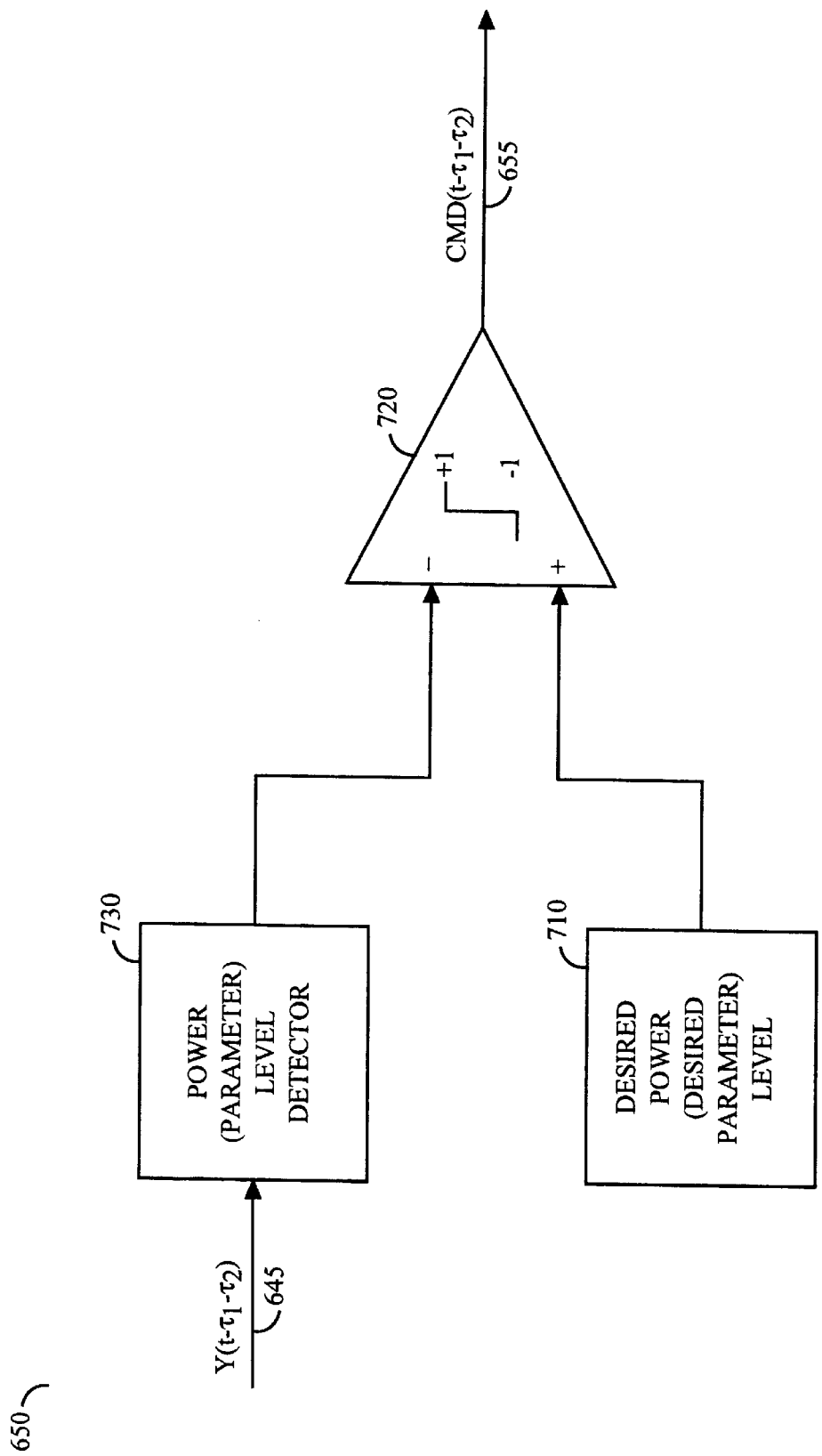
FIG. 7 illustrates a conventional compensator used in power control loops.

FIG. 7 illustrates an operation of a conventional compensator 650 in further detail. Conventional compensator 650 includes a desired power level (or other corresponding parameter) threshold 710, a power level (corresponding parameter) detector 730, and a comparator 720. Power level detector 730 determines a power level of signal 645 according to well-known techniques in communication systems. Comparator 720 determines a difference between the power level of signal 645 from power level detector 730 and desired power level threshold 710. Comparator 720 outputs a power-up command when the power level of signal 645 is less than desired power level threshold 710. Comparator 720 issues a power-down command when the power level of signal 645 is greater than desired power level threshold 710.

Figure 8:
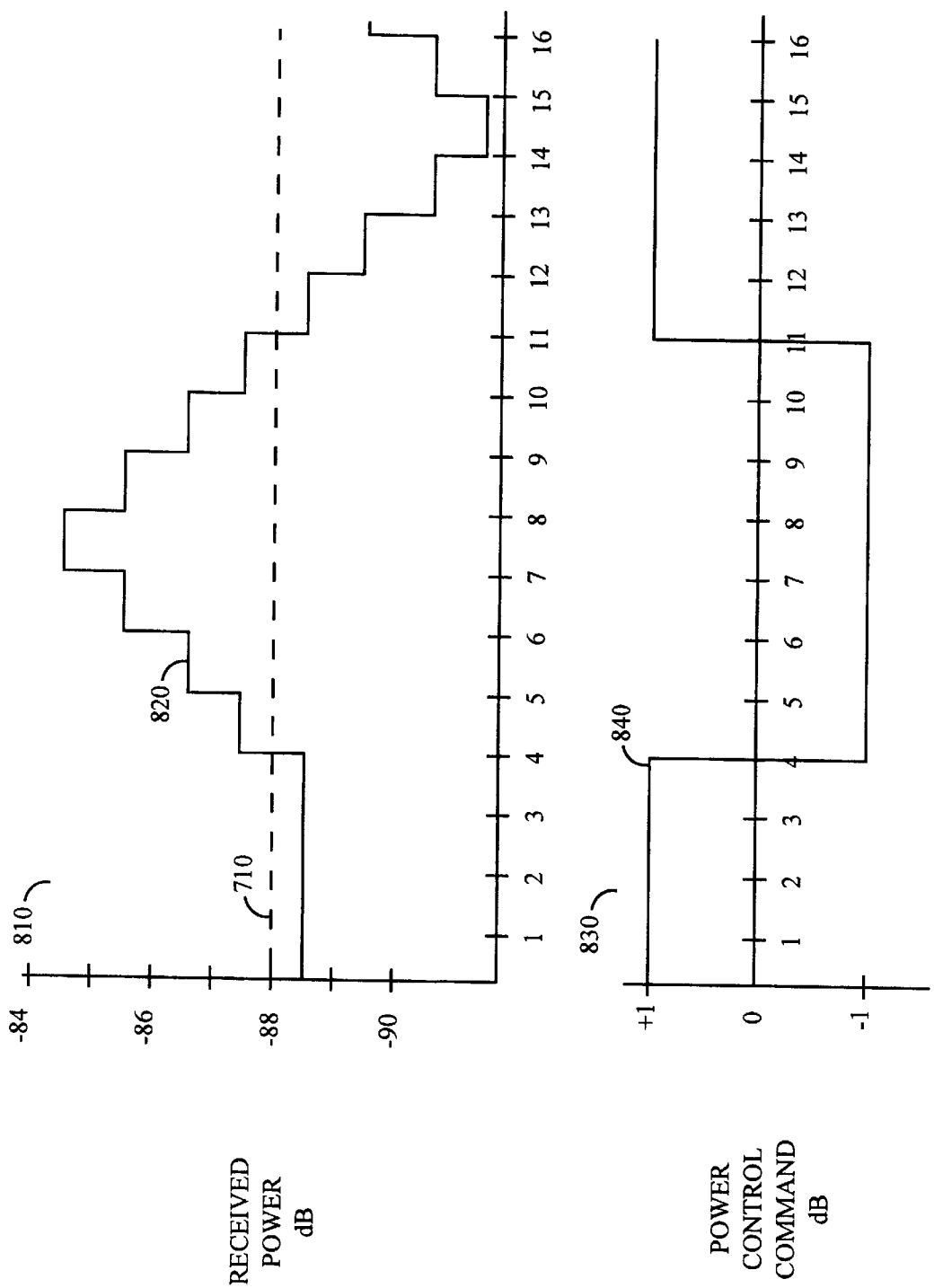
FIG. 8 illustrates a limit cycle problem of the conventional compensator.

FIG. 8 illustrates the operation of conventional compensator 650. FIG. 8 includes two plots: a received power plot 810 and a power control command plot 830. Received power plot 810 represents an exemplary received power level 820 of signal 645 received by conventional compensator 650 over time. Power control command plot 830 represents a power control command 840 output by conventional compensator 650 in response to received power level 820 over time. The following is a discussion of the operation of conventional compensator 650 in response to receive power level 820.

As shown in FIG. 8, at time t=0, received power level 820 is −88.5 dB. In this particular example, desired power level threshold 710 is set at −88 dB, with this level being chosen in each communication system according to known principles. Hence, received power level 820 is less than desired power level 710. In response, conventional compensator 650 issues a power-up command to controller 610 indicating that controller 610 should increase the transmit power of signal 615. Thus, power control command 840 at time t=0 is +1. (In this example, power-up commands are indicated as +1 and power-down commands are indicated as −1 in power control command plot 830.)

The following assumptions are made for purposes of illustration only and are made merely to demonstrate the operation of conventional compensator 650. A first assumption is that the loop iteration time of conventional compensator 650 is arbitrarily selected as one-fourth of the total delay $\tau_1+\tau_2+\tau_3$ as a result of propagation delays. In other words, four power control commands 655 are issued from conventional compensator 650 before the first power control command 655 is detected as received power level 820 by conventional compensator 650. A second assumption is that a power-up command instructs controller 610 to increase the power level of signal 615 by 1 dB and that a power-down command instructs controller 610 to decrease the power level of signal 615 by 1 dB. These assumptions are made solely for purposes of illustrating the operation of the invention, and are reasonable for typical communication systems. However, each system has its own iteration times and known command levels.

Reference is now made to FIG. 8. As a result of the propagation delays, at time t=1, a response to power control command 840 issued at time t=0 has not yet been detected by compensator 650. Thus, received power level 820 is still less than desired power level threshold 710. Hence, compensator 650 issues another power-up command at time t=1. The same occurs at time t=2 and at time t=3.

However, at a time t=4, the power-up command issued at time t=0 has been received by controller 610 and its effect propagated back to conventional compensator 650. In other words, at time t=4, conventional compensator 650 detects a change in received power level 820 as a result of power control command 840 issued at time t=0. Thus, at time t=4, received power level 820 has increased by 1 dB to −87.5 dB.

At time t=4, conventional compensator 650 determines that received power level 820 exceeds desired power level threshold 710 and, therefore, issues a power-down command. As discussed above, the power-down command indicates to controller 610 to decrease the transmit power of signal 615.

At time t=5, a further increase in received power level 820 is detected at conventional compensator 650 because of power control command 840 issued at time t=1. Thus, because of the delay between issuing power control commands 840 and detecting the response, received power level 820 increases for each of the four power-up commands issued at times t=0, t=1, t=2 and t=3. As a result, received power level 820 overshoots desired power level threshold 710 by 3.5 dB.

This illustrates the problem of limit cycle described above. Because of the delay $\tau_1+\tau_2+\tau_3$, conventional compensator 650 issues power-up commands from time t=0 to time t=3. Each of these power-up commands will be received by controller 610 resulting in an increase of the transmit power of signal 615. However, at a time t=4, when received power level 820 exceeds desired power level threshold 710, compensator 650 begins issuing power-down commands and continues issuing power-down commands until time t=11. At time t=11, received power level 820 will fall below desired power level 710 and conventional compensator 650 will begin issuing power-up commands again. This process continues indefinitely with received power level 820 oscillating about desired power level threshold 710. Because of the propagation delay $\tau_1+\tau_2+\tau_3$, received power level 820 will generally never match desired power level threshold 710. This limit cycle represents the best operation of which conventional compensator 650 is capable. That is, the limit cycle represents how well or how closely compensator 650 can hold signals to a specific desired power level. This represents a waste in power which reduces system capacity and mobile unit operating time.

Figure 9:
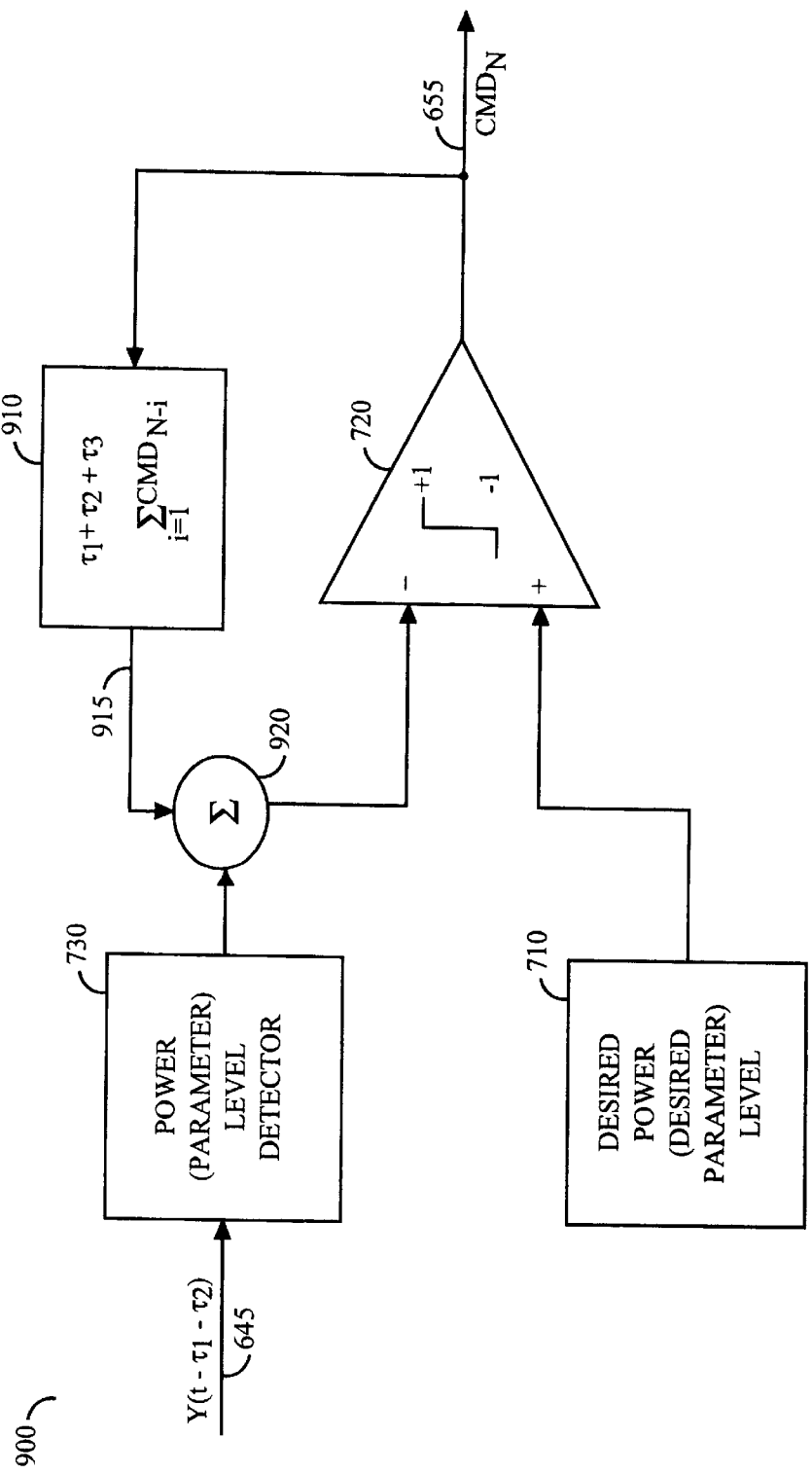
FIG. 9 illustrates a compensator according to the present invention for use in power control loops.

FIG. 9 illustrates an improved compensator 900 according to the present invention. In the present invention, compensator 900 replaces conventional compensator 650 in FIG. 6. Compensator 900 accounts for power control commands 655 that had been issued by compensator 900 whose responses have not had time to propagate back to compensator 900.

In particular, compensator 900 includes desired power level threshold 710, power level detector 730, comparator 720, a pending command accumulator 910, and a summer 920. Power level detector 730 and desired power level threshold 710 operate as described above with respect to conventional compensator 650.

Pending command accumulator 910 accumulates a sum 915 of pending power control commands 655 that have been issued by compensator 900 but that have not propagated through control loop 600 so that their response has been detected by compensator 900. In one embodiment, accumulator 910 accumulates adjustments commanded in terms of up or down steps to arrive at a net step change which is then converted into a net change in power. In another embodiment, accumulator 910 accumulates a power value (i.e., in dB) associated with each command as issued. Pending command accumulator 910 determines pending power control commands 655 at iteration N according to the following relationship:

$$PCMD_N = \sum_{i=1}^{\frac{\tau_1+\tau_2+\tau_3}{T}} CMD_{N-i}$$

where:

PCMD$_N$ is the sum of the pending commands at iteration N;

$\tau_1+\tau_2+\tau_3$ is the total, round-trip propagation delay; and

T is the loop iteration period.

As a practical matter, the number of power control commands that are accumulated depends on the propagation delays experienced in forward link signal 410 and reverse link signal 420, and the iteration time of control loop 600. For example, if the total propagation delay is 50 ms and the iteration period of control loop 600 is 12.5 ms, four power control commands 655 are accumulated by pending command accumulator 910.

Pending command accumulator 910 outputs a power level corresponding to the sum 915 of power control commands whose responses have not been detected to summer 920. Summer 920 adds the output of pending command accumulator 910 to received power level 645. Summer 920 outputs the sum of these signals to comparator 720.

Comparator 720 issues a power-up command if the output of summer 920 is less than desired power level threshold 710. Comparator 720 issues a power-down command when the output of summer 920 is greater than desired power level threshold 710.

Figure 10:
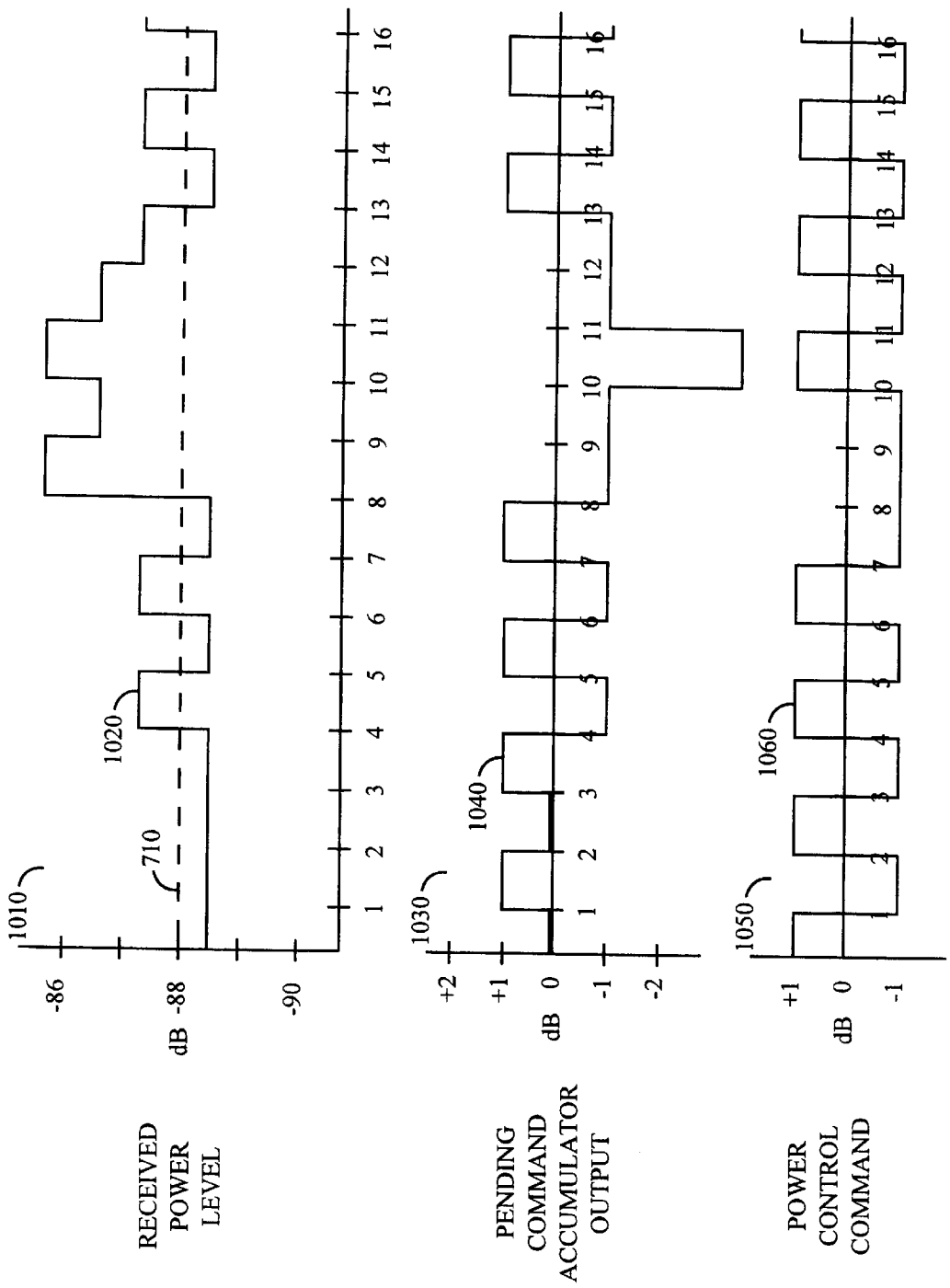
FIG. 10 illustrates an improved response of the compensator according to the present invention including a reduction in the limit cycle.

An operation of compensator 900 is illustrated in FIG. 10. The same assumptions are made here as were made above with respect to FIG. 8, solely for purposes of illustration. Those assumptions are that four power control commands are issued before the effect of the first is detected and that the power-up and power-down commands change the transmit power level of signal 615 by 1 dB.

FIG. 10 includes a received power level plot 1010, showing received power level 1020 versus time; a pending command accumulator output plot 1030, showing a pending command accumulator output 1040 versus time; and a power control command plot 1050, showing a power control command or commands 1060 versus time.

Referring to FIG. 10, at a time t=0, received power level 1020 is −88.5 dB. A desired power level threshold 710 is set at −88 dB. Thus, at time=0, received power level 1020 is less than desired power level threshold 710. Assuming no previous power level control commands have been issued (i.e., no power control commands are pending), compensator 900 outputs a power-up command at time t=0.

At time t=1, because the response to the power-up command has not propagated through power control loop 600, received power level 1020 remains less than desired power level threshold 710. In this case, however, pending command accumulator output 1040 at time t=1 is equal to 1 dB representing the first power control command that has been issued and whose response has not yet been detected.

When pending command accumulator output 1040 is added to received power level 1020, desired power level threshold 710 is exceeded. Thus, in this case, comparator 720 would indicate a power-down command reflecting received power level 1020 at time t=1, as well as power control command 1060 at time t=0.

At time t=2, compensator 900 still has not detected a response to either power control command 1060 at time t=0 or at time t=1. Pending power command accumulator output 1040 at time t=2 represents the sum of power control commands at time t=0 and at time t=1, which is 0. Adding pending command accumulator output 1040 at time t=2 to received power level 1020 at time t=2 indicates that the sum is less than desired power level threshold 710. Thus, comparator 720 issues a power-up command at time t=2. A similar process is followed at time t=3 to issue a power-down command.

At time t=4, the response to power control command 1060 issued at time t=0 is detected by compensator 900. As a result, received power level 1020 at time t=4 has increased by 1 dB. At time t=4, received power level 1020 exceeds desired power level 710. However, all pending power control commands 1060 have not yet been detected by compensator 900. In fact, at time t=4, accumulator output 1040 indicates a sum of −1 dB change in received power level 1020. Adding received power level 1020 and pending command accumulator output 1040 at time t=4 indicates that a power-up command should be issued at time t=4 because the sum of pending command accumulator output 1040 and received power level 1020 is less than desired power level threshold 710.

Between times t=4 and t=8, power control command 1060 oscillates between +1 and −1 as received power level 1020 oscillates about desired power level threshold 710. This represents the limit cycle of compensator 900. Compared with the limit cycle of received power level 820 in FIG. 8, compensator 900 dramatically improves the performance of power control loop 600.

For purposes of further illustration at time t=8, a fade occurs in process 630 producing an uncommanded change in received power level 1020 of +2 dB (in addition to the +1 dB commanded change from the power-up command at time t=4) resulting in a received power level 1020 of −85.5 dB. Thus, at time t=8, received power level 1020 is added to pending command accumulator output 1040 and input to comparator 720. Comparator 720 outputs a power-down command. Due to the propagation delays $\tau_1+\tau_2+\tau_3$, this power-down command at t=8 will not be detected by compensator 900 until time t=12. Thus, between times t=8 and t=12, received power level 1020 oscillates about −86 dB. That is, a control loop with a loop delay (e.g., propagation delay) that is large with respect to the loop iteration time (i.e., sample rate or update rate of the loop) has some oscillatory behavior which is also affected by the level of quantization.

However, consecutive power-down commands at time t=9 and at time t=10 followed by a power-up command at time t=11 demonstrate the effectiveness of pending command accumulator output 1040 in bringing received power level 1020 back down into a limit cycle about desired power level threshold 710 at time t=13 in response to the fade at time t=8.

In effect, compensator 900 accounts for commands that have not yet propagated through power control loop 600. Pending command 26 accumulator 910 accounts for these power control commands so that future power control commands are based on their pending, but not yet detected, changes in received power level 1020.

Figure 11:
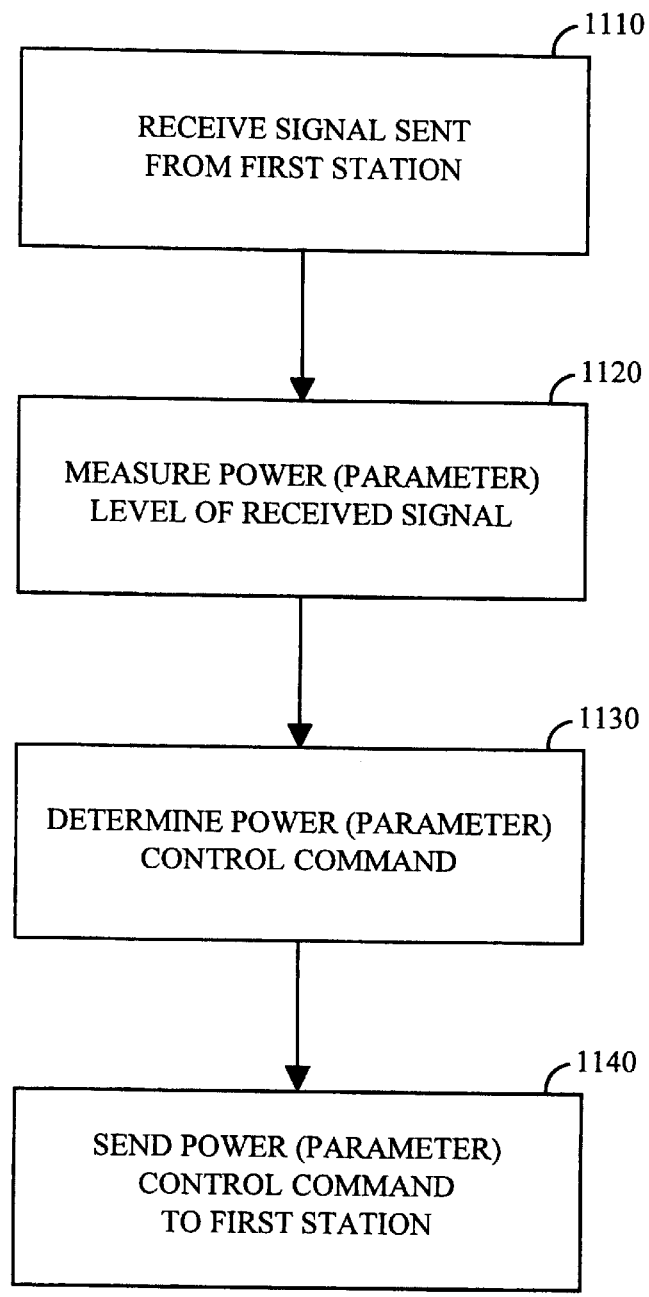
FIG. 11 is a flowchart illustrating the operation of the present invention.

FIG. 11 is a flowchart illustrating the operation of the present invention. In a step 1110, signal 645 is received at compensator 900 located at a first station. In a preferred embodiment of the present invention, the first station corresponds to gateway 120. However, in alternate embodiments of the present invention, compensator 900 is located in mobile unit 124.

In a step 1120, power level detector 730 measures a power level of signal 645 according to well-known techniques. In a step 1130, compensator 900 determines a power control command 655 based on the measured power of signal 645, desired power level 710, and a sum 915 of pending power control commands 655. In a step 1140, power control command 655 is sent to the first station so that the power of signal 645 can be increased or decreased as appropriate.

Figure 12:
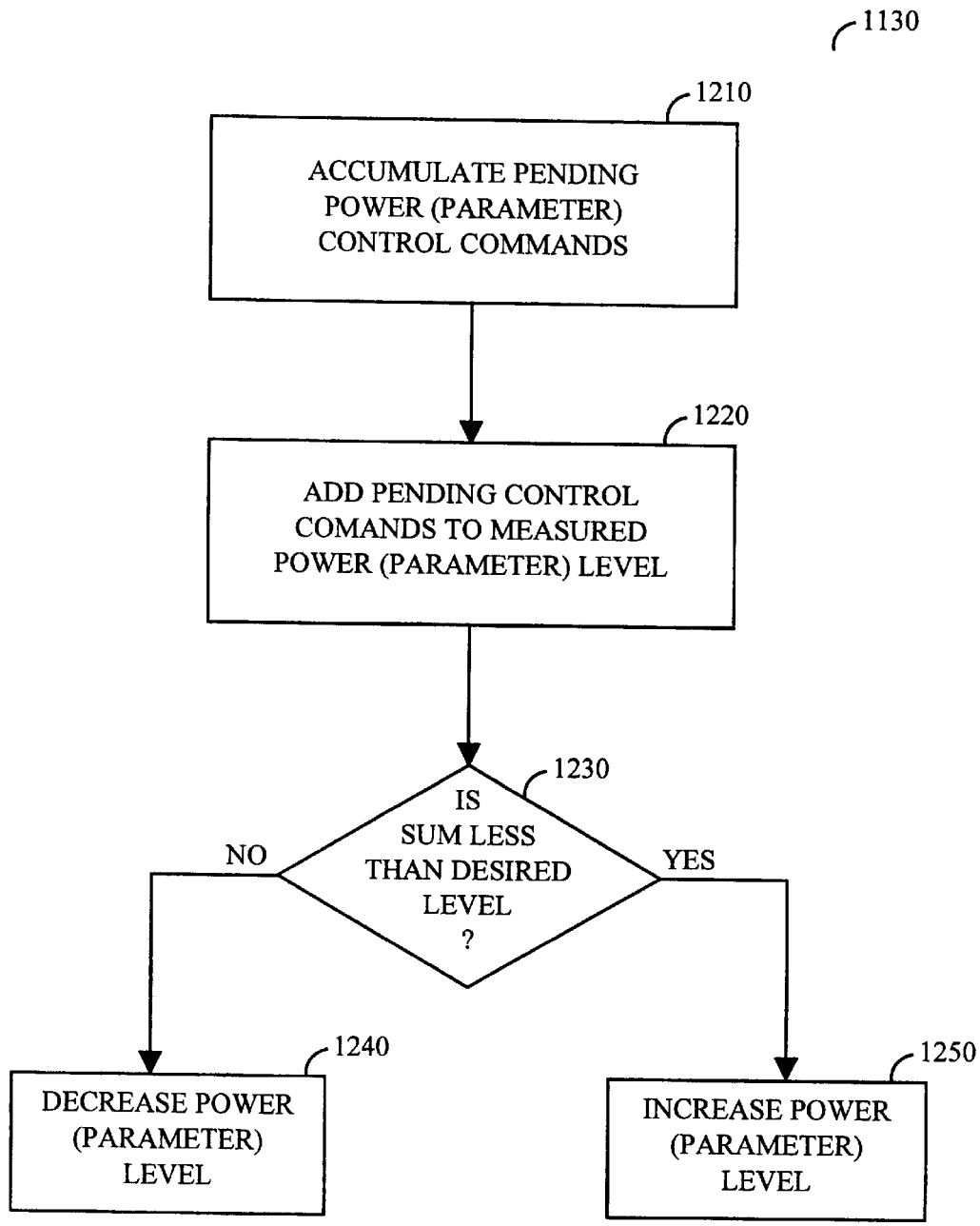
FIG. 12 is a flowchart illustrating the operation of the compensator in further detail.

FIG. 12 is a flowchart illustrating the operation of compensator 900 in further detail. Specifically, FIG. 12 illustrates the operation of step 1130 discussed above with reference to FIG. 11. In a step 1210, pending command accumulator 910 accumulates pending power control commands 655. As discussed above, pending control commands 655 are those control commands whose responses have not had time to propagate back to compensator 900.

In a step 1220, a power level corresponding to pending control commands 655 is added to the power level of received signal 645. In a decision step 1230, the sum of the pending control commands 655 and the power of the received signal 645 is compared with desired power level 710.

If the sum of the pending control commands 655 and the power of the received signal 645 is less than desired power level 710, in a step 1250, a power command is issued to increase the power level of signal 645. If the sum of the pending control commands 655 and the power of the received signal 645 is not less than desired power level 710, in a step 1240, a power command is issued to decrease the power level of signal 645. As discussed above, in a preferred embodiment of the present invention, a power-up command is issued to increase the power level of signal 645 and a power-down command is issued to decrease the power level of signal 645.

In some communication systems, the same or additional compensator elements 900 could be used to detect other operating parameters of communication signals such as frequency, code timing, and so forth. Commands, such as up and down or advance and retard commands, can then be generated as appropriate, which mobile unit 124 uses to implement changes in such parameters. For example, mobile unit 124 can be told to adjust the operating frequency for return link signals to counter drift in mobile unit's 124 local oscillator center frequency, or code timing cold be changed to compensate for Doppler effects, and so forth. Many parameters and processes are well known for which compensation could be effected using commands, but which also suffer from the same time or transfer delays experienced by the power control commands discussed above.

While this invention has been described in terms of a satellite based communication system 100, the present invention could also be implemented in systems not employing satellites. For example, in terrestrial systems, a similar problem with limit cycles might occur if propagation between a cell-site and a mobile unit 124 is large in comparison to the loop iteration time of power control loop 600.

In addition, the present invention has been described as adjusting the transmit power of a mobile unit 124 wherein compensator 900 was located at gateway 120 and controller 610 is located at mobile unit 124. As would be apparent, a similar control loop could be set up where compensator 900 is located at mobile unit 124 and controller 610 is located at gateway 120 so that the power transmitted from gateway 120 can be controlled.

Alternatively, measurement of power or power relative to a threshold can occur at mobile unit 124, with that information being transmitted back to gateway 120 where compensation processing occurs to adjust the power of the gateway signals. This approach may be preferred because it minimizes resource requirements and complexity in mobile unit 124, and uses the greater computation resources of gateways 120. In this situation, commands are not transmitted as signals 655 and 665 which are delayed, but as information signals which are delayed. The delay values are the same otherwise.

This invention has also been described in terms of a single-bit system wherein a power-up command or a power-down command was issued by compensator 900 instructing controller 610 to increase or decrease transmit power by a fixed amount. However, different schemes could be implemented wherein power control command is quantized depending on a difference between desired power level 710 and received power level 645 as would be apparent.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for controlling a power level of a signal in a communication system a having a first station, a second station, and a satellite link coupling the first station and the second station, the communication system having a significant propagation delay between the first station and the second station, the method comprising the steps of:

measuring a received power level of the signal, wherein the signal is transmitted from the second station to the first station via the satellite link;

generating a power control command at the first station; and sending said power control command from the first station to the second station, wherein said step of generating a power control command generates said power control command as a function of said received power level, a desired power level, and at least one previous power control command sent from the first station to the second station.

2. The method of claim 1, wherein said step of generating a power control command generates said power control command as a function of said received power level, said desired power level, and at least one previous power control command sent from the first station to the second station that has not been received by the second station.

3. The method of claim 1, further comprising the step of:

receiving, at the second station, said power control command from the first station.

4. The method of claim 1, wherein said step of generating a power control command generates said power control command as a function of said received power level, said desired power level, and at least one previous power control command, sent from the first station to the second station, that has been received by the second station.

5. The method of claim 3, further comprising the step of:

adjusting a transmitted power level of the signal in response to said power control command to produce an adjusted signal at the second station.

6. The method of claim 5, wherein said step of generating a power control command generates said power control command as a function of said received power level, said desired power level, and at least one previous power control command, sent from the first station to the second station, that has not produced said adjusted signal at the second station.

7. The method of claim 5, further comprising the step of:
transmitting said adjusted signal from the second station to the first station.

8. The method of claim 7, wherein said step of generating a power control command generates said power control command as a function of said received power level, said desired power level, and at least one previous power control command, sent from the first station to the second station, that has produced said adjusted signal that has not been received by the first station.

9. The method of claim 5, wherein said step of adjusting comprises the step of:
adjusting said transmitted power level by a fixed amount in response to said power control command.

10. The method of claim 5, wherein said step of adjusting comprises the steps of:
increasing said transmitted power level by a first fixed amount in response to a power control command that directs the second station to increase said transmitted power level; and
decreasing said transmitted power level by a second fixed amount in response to a power control command that directs the second station to decrease said transmitted power level.

11. The method of claim 10, wherein said first fixed amount and said second fixed amount are equal.

12. A system for controlling a power level of a signal in a satellite communications system having a first station, a second station, and a satellite link coupling the first station and the second station, the system comprising:
means for measuring a received power level of the signal, wherein the signal is transmitted from the second station and received by the first station;
means for generating a power control command at the first station; and
means for sending said power control command from the first station to the second station,
wherein said means for generating a power control command generates said power control command as a function of said received power level, a desired power level, and at least one previous power control command sent from the first station to the second station.

13. The system of claim 12 wherein said means for generating a power control command generates said power control command as a function of said received power level, said desired power level, and at least one previous power control command, sent from the first station to the second station, that has not been received by the second station.

14. The system of claim 12 further comprising:
means for receiving, at the second station, said power control command from the first station.

15. The system of claim 12, wherein said means for generating a power control command generates said power control command as a function of said received power level, said desired power level, and at least one previous power control command, sent from the first station to the second station, that has been received by the second station.

16. The system of claim 14, further comprising:
means for adjusting a transmitted power level of the signal in response to said power control command to produce an adjusted signal at the second station.

17. The system of claim 16, wherein said means for generating a power control command generates said power control command as a function of said received power level, said desired power level, and at least one previous power control command, sent from the first station to the second station, that has not produced said adjusted signal at the second station.

18. The system of claim 16, further comprising:
means for transmitting said adjusted signal from the second station to the first station.

19. The system of claim 18, wherein said means for generating a power control command generates said power control command as a function of said received power level, said desired power level, and at least one previous power control command, sent from the first station to the second station, that has produced said adjusted signal that has not been received by the first station.

20. The system of claim 16, wherein said means for adjusting comprises:
means for adjusting said transmitted power level by a fixed amount in response to said power control command.

21. The system of claim 16, wherein said means for adjusting comprises:
means for increasing said transmitted power level by a first fixed amount in response to a power control command that directs the second station to increase said transmitted power level; and
means for decreasing said transmitted power level by a second fixed amount in response to a power control command that directs the second station to decrease said transmitted power level.

22. The system of claim 21, wherein said first fixed amount and said second fixed amount are equal.

23. An apparatus for controlling a power level of a transmitted signal in a satellite communications system having a first station, a second station, and a satellite link coupling the first station and the second station, wherein the transmitted signal experiences a propagation delay between the first station and the second station, the apparatus comprising:
a power level detector, located in the first station, for measuring a received power level of the signal transmitted from the second station to the first station;
a compensator, located at the first station, for generating a power control command that instructs the second station to adjust its transmit power; and
a transmitter for sending said power control command from the first station to the second station,
wherein said compensator generates a power control command as a function of said received power level, a desired power level, and at least one pending power control command sent from the first station to the second station.

24. The apparatus of claim 23, wherein said compensator comprises:
a pending command accumulator that accumulates pending power control commands sent from the first station to the second station; and
a comparator that compares said received power level adjusted by an output of said pending command accumulator with said desired power level to determine said power control command.

25. The apparatus of claim 24, wherein said pending command accumulator accumulates said pending power control commands, sent from the first station to the second station, that have not been received by the second station.

26. The apparatus of claim 24, wherein said pending command accumulator accumulates said pending power control commands, sent from the first station to the second station, that have not produced an adjusted signal sent from the second station.

27. The apparatus of claim 24, wherein said pending command accumulator accumulates said pending power control commands, sent from the first station to the second station, that have produced an adjusted signal sent from the second station to the first station that has not been received by the first station.

28. The apparatus of claim 24, wherein said pending command accumulator accumulates a number of pending power control commands, sent from the first station to the second station, based on the propagation delay and a loop iteration time associated with said compensator.

29. A method for controlling a parameter associated with a signal in a communication system a having a first station, a second station, and a satellite link coupling the first station and the second station, the communication system having a significant propagation delay between the first station and the second station, the method comprising the steps of:
measuring the parameter of the signal, wherein the signal is transmitted from the second station to the first station via the satellite link;
generating a control command at the first station; and
sending said control command from the first station to the second station,
wherein said step of generating a control command generates said control command as a function of said measured parameter, a desired level for the parameter, and at least one previous control command sent from the first station to the second station.

30. The method of claim 29, wherein said step of generating a control command generates said control command as a function of said measured parameter, said desired level for the parameter, and at least one previous control command, sent from the first station to the second station, that has not been received by the second station.

31. The method of claim 29, further comprising the step of:
receiving, at the second station, said control command from the first station.

32. The method of claim 29, wherein said step of generating a control command generates said control command as a function of said measured parameter, said desired level for the parameter, and at least one previous control command, sent from the first station to the second station, that has been received by the second station.

33. The method of claim 31, further comprising the step of:
adjusting the parameter of the signal in response to said control command to produce an adjusted signal at the second station.

34. The method of claim 33, wherein said step of generating a control command generates said control command as a function of said measured parameter, said desired level for the parameter, and at least one previous control command, sent from the first station to the second station, that has not produced said adjusted signal at the second station.

35. The method of claim 33, further comprising the step of:
transmitting said adjusted signal from the second station to the first station.

36. The method of claim 35, wherein said step of generating a control command generates said control command as a function of said measured parameter, said desired level for the parameter, and at least one previous control command, sent from the first station to the second station, that has produced said adjusted signal that has not been received by the first station.

37. The method of claim 33, wherein said step of adjusting comprises the step of:
adjusting a level of the parameter by a fixed amount in response to said control command.

38. The method of claim 33, wherein said step of adjusting comprises the steps of:
increasing a level of the parameter by a first fixed amount in response to a control command that directs the second station to increase said level of the parameter; and
decreasing said level of the parameter by a second fixed amount in response to a control command that directs the second station to decrease said level of the parameter.

39. The method of claim 38, wherein said first fixed amount and said second fixed amount are equal.

40. The method of claim 29, wherein the signal is a communication signal in a spread spectrum communication system.

* * * * *